March 17, 1959 N. L. LEEK 2,878,318

MULTIPLEX TRANSMISSION SYSTEM

Filed Feb. 15, 1956 2 Sheets-Sheet 1

INVENTOR.

INVENTOR.
N. L. Leek

United States Patent Office 2,878,318

Patented Mar. 17, 1959

2,878,318

MULTIPLEX TRANSMISSION SYSTEM

Nathaniel L. Leek, Bronxville, N. Y.

Application February 15, 1956, Serial No. 565,591

10 Claims. (Cl. 179—15)

Figure 1:
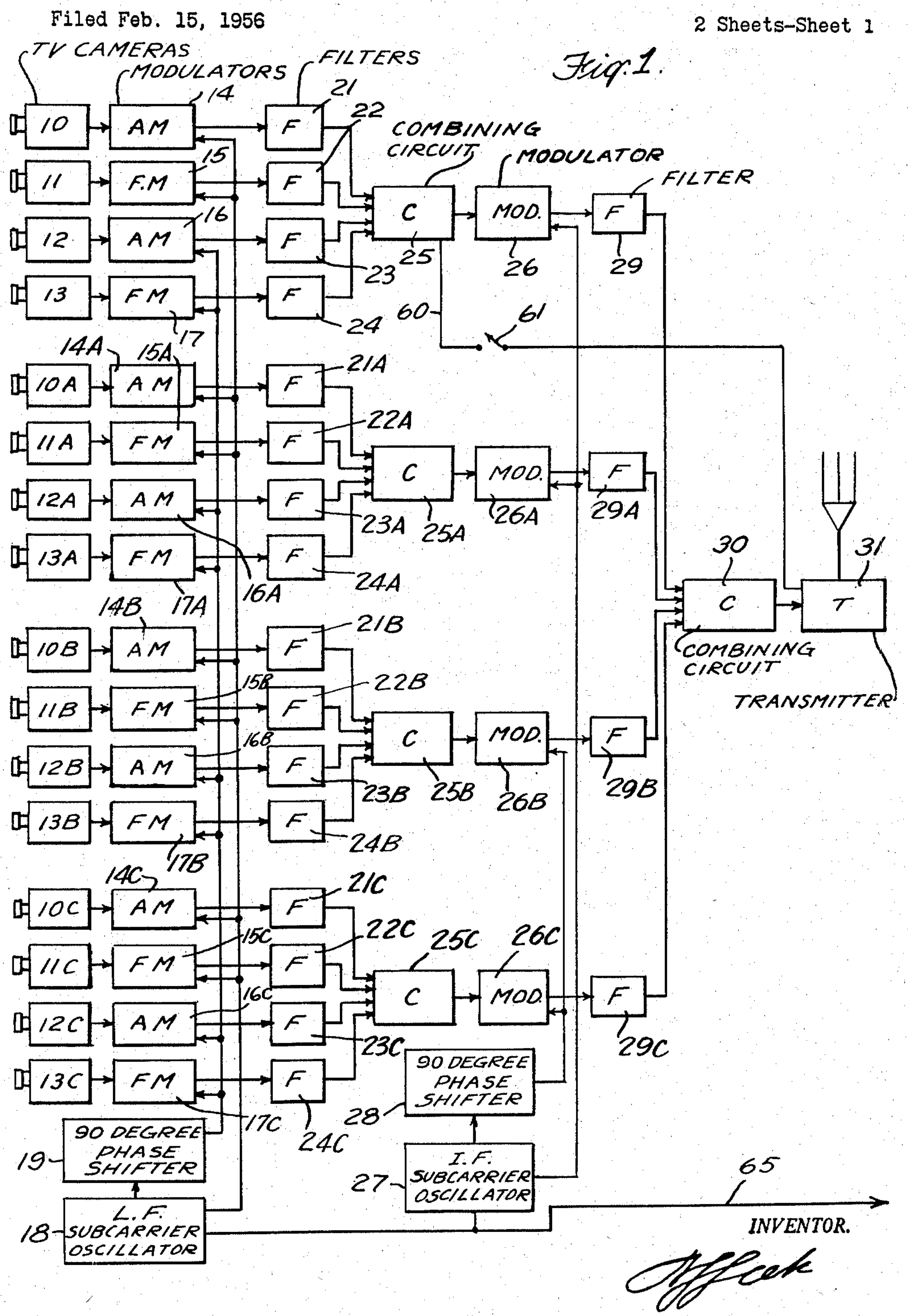

This invention relates to a system for multiplexing electrical signals and is particularly applicable to radio or television broadcasting or closed circuit systems.

An object is to provide a system by which a plurality of different programs can be transmitted over the same channel.

Another object is to provide a subscription television system in which a plurality of programs are transmitted over a single channel and made available to subscribers by a combination of low and intermediate frequency voltages transmitted over a line.

Other objects and advantages will be apparent as the nature of the invention is more fully disclosed.

The nature of the invention will be better understood by referring to the following description, taken in connection with the accompanying drawing in which a specific embodiment has been set forth for purposes of illustration.

Figure 2:
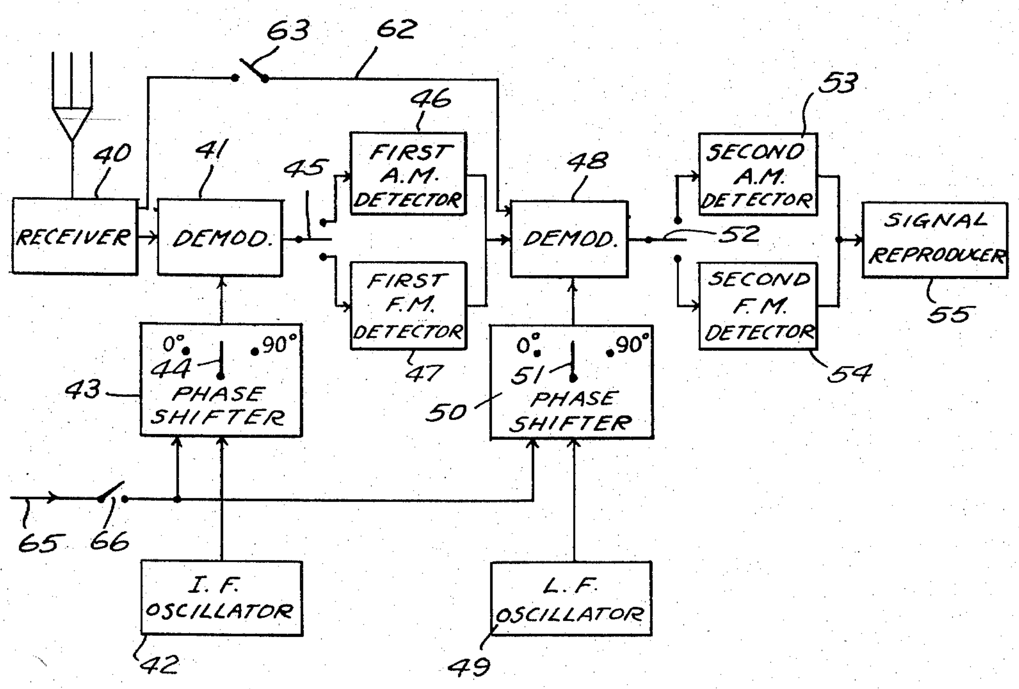

In the drawings:

Fig. 1 is a block diagram of a transmitting system for transmitting signals representing a plurality of different programs; and Fig. 2 is a block diagram of a broadcast receiver to cooperate with the transmitter of Fig. 1.

Referring first to Fig. 1, a group of four television cameras 10, 11, 12, 13, each adapted to produce television type signals including the usual synchronizing signals, are shown as connected to supply such signals to modulators 14, 15, 16, 17 respectively. The modulators 14 and 15 are supplied with a low frequency subcarrier from a low frequency oscillator 18. Modulators 16 and 17 are supplied with the same low frequency subcarrier, shifted in phase by 90° in phase shifter 19. The modulators 14 and 16 are adapted to amplitude modulate the low frequency subcarrier in accordance with the signals from the cameras 10 and 12 respectively. Modulators 15 and 17 are adapted to frequency modulate the low frequency subcarrier in accordance with signals from the cameras 11 and 13 respectively.

The outputs of the modulators 14 to 17 are passed through filters 21 to 24 respectively which are adapted to suppress the carrier and one side band and pass a single side band only. The modulators 14 to 17 may be of the carrier suppression type which pass the side bands only in which case the filters 21 to 24 suppress a side band only.

The outputs of the filters 21 to 24 are combined in a combining circuit 25 and applied to an input of a modulator 26 which is supplied with an intermediate frequency subcarrier derived from an intermediate frequency oscillator 27. The modulator 26 is adapted to amplitude modulate the intermediate frequency subcarrier supplied by oscillator 27, in accordance with the signals derived from the combining circuit 25.

In a similar way groups of cameras 10A to 13B, 10B to 13B, and 10C to 13C are connected to modulators 14A to 17A, 14B to 17B and 14C to 17C respectively which are supplied with the low frequency subcarrier from oscillator 18 and phase shifter 19 in the same manner as modulators 14 to 17 to provide a similar series of A. M. and F. M. outputs which pass through filters 21A to 24A, 21B to 24B and 21C to 24C respectively to combining circuits 25A, 25B and 25C, the combined outputs of which are supplied to modulators 26A, 26B and 26C respectively.

Modulator 26A is adapted to frequency modulate the intermediate frequency subcarrier derived from oscillator 27. The oscillator 27 is connected through a 90° phase shifter 28 to supply the intermediate frequency subcarrier with a 90° phase shift to modulators 26B and 26C which are adapted to amplitude modulate and frequency modulate the subcarrier in accordance with signals received from the respective combining circuits.

The outputs of the modulators 26, 26A, 26B and 26C are passed through filters 29, 29A, 29B and 29C respectively which pass only a single side band and suppress the carrier and the other side band, to combining circuit 30 wherein the various signals are combined. The combined output of the circuit 30 is applied to modulate a radio frequency carrier of a transmitter 31 which may be adapted to transmit the signal by the usual radio or television channels or over a closed circuit according to the particular type of service required.

In the above system, each combining circuit combines a first amplitude modulated side band and a first frequency modulated side band derived from the same suppressed carrier, and a second amplitude modulated side band and a second frequency modulated side band derived from a second suppressed carrier which is displaced in phase by 90° from the first carrier. The signals are received and separated in a receiver of the type shown in Fig. 2.

Referring to Fig. 2 the transmitted signal is received in a receiver 40 having the usual radio frequency responsive circuits and is supplied to a first demodulator 41 where the intermediate frequency subcarrier is reintroduced from an oscillator 42 and a phase shifter 43 adapted to produce a 0° phase shift or 90° phase shift in the subcarrier according to the position of a switch 44.

The demodulator 41 is connected through a switch 45 to a first amplitude modulation detector 46 or a first frequency modulation detector 47 which are adapted respectively to derive the A. M. and F. M. side bands corresponding to those combined in the combining circuit 30 of Fig. 1. The output of the first detector 46 or 47 is selected by suitable actuation of the switches 44 and 45 to conform to any one of the side bands which were supplied to the combining circuit 30 from the modulators 26, 26A, 26B or 26C of Fig. 1.

The signals from the first detectors 46 and 47 are fed to a demodulator 48, which is supplied with the low frequency subcarrier from a low frequency oscillator 49 through a phase shifter 50 adapted to produce a 0° phase shift or a 90° phase shift in the subcarrier according to the position of switch 51.

The demodulator 48 is connected through switch 52 to a second amplitude modulation detector 53 or a second frequency modulation detector 54 which are adapted to derive the A. M. and F. M. side bands respectively which were combined in the combining circuit 25, 25A, 25B or 25C of Fig. 1. Any one of these side bands is selected according to the setting of the switches 51 and 52.

The outputs of the second detectors 53 and 54 are connected to a signal reproducing device 55 such as a loud speaker or a television receiver, according to the type of signal being received.

In the above system the demodulators 41 and 48 reintroduce the respective subcarriers having a 0° or 90° phase angle to derive the corresponding A. M. and F. M. side bands which are then separated and detected by the A. M. and F. M. detectors. In this way any one of the signals from the individual cameras 10 to 13C may be selected and supplied to the reproducing device 55.

The switches 44, 45, 51 and 52 may be gauged on a controller for selecting the various signals with a single control.

If only the four signals from cameras 10 to 13 are to be transmitted the combining circuit 25 may be connected directly to the transmitter 31 by a line 60 and switch 61 to modulate the R. F. carrier emitted by the transmitter. In that case the I. F. subcarrier is not required. In Fig. 2 the receiver 40 is connected directly to the demodulator 48 by line 62 and switch 63 as the first demodulator 41 is not required.

The four signals from the cameras 10 to 13 comprise two subcarriers of 90° phase displacement, each modulated by amplitude and frequency modulations which are separated by varying the phase angle of the low frequency subcarrier supplied from the oscillator 49 and by using either the A. M. detector 53 or the F. M. detector 54 as above described. In that case the I. F. oscillator is not required.

This system is particularly adaptable to subscription television. In that case the R. F. transmitter of Fig. 1 is used to transmit the combined signals in the usual manner. The low frequency subcarriers from the L. F. oscillator 18 and the intermediate frequency subcarrier from the I. F. oscillator 27 are both transmitted over a line 65 which constitutes a closed circuit line to the receiver. In the receiver the line 65 is connected through switch 66 to supply the I. F. subcarrier to the phase shifter 43 and to supply the L. F. subcarrier to the phase shifter 50. The oscillators 42 and 49 are omitted from such a subscription received and the signals are only made available when the subcarriers are supplied to the receiver by the line 65. The closed circuit line 65 accordingly is not required to transmit the high frequencies required for the signal itself and a lower quality line can be used. In addition the frequencies of the subcarriers can be changed as required for secrecy purposes since the same subcarriers are automatically supplied to both the transmitter and the receiver.

What is claimed is:

1. A multiplex transmission system comprising a plurality of channels, each including a group of different signal sources, a source of a first subcarrier, separate modulation means in each channel connected to amplitude modulate and frequency modulate said first subcarrier by signals from different sources in the respective groups to produce first amplitude modulation and frequency modulation products respectively, means combining the modulation products of each channel into a combined output, a source of a second subcarrier, modulation means connected to amplitude modulate said second subcarrier with the combined modulation output of one of said channels and to frequency modulate said second subcarrier with the combined modulation output of another of said channels to form second amplitude and frequency modulation products, carrier transmission means and means connected to modulate said transmission means by said second modulation products for transmission to a distant point, said signals, first and second subcarriers and carrier transmission means having respectively progressively higher frequency ranges.

2. A system as set forth in claim 1 in which said modulating means includes means for suppressing the subcarriers from said modulation products.

3. A multiplex transmission system comprising four channels, each channel having four different signal sources, means for supplying to each channel a pair of first subcarriers having the same frequency but displaced in phase by 90°, each channel having amplitude modulation means connected to amplitude modulate said first subcarriers by signals from a first and a second of said sources respectively and having frequency modulation means connected to frequency modulate said first subcarriers by signals from a third and a fourth of said sources respectively to produce a pair of amplitude modulation products in phase quadrature and a pair of frequency modulation products in phase quadrature, combining means to combine said modulation products in each channel into a combined output, means producing a pair of second subcarriers of the same frequency but differing in phase by 90°, amplitude modulation means connected to amplitude modulate said second subcarriers with the combined output products of a first and a second of said channels respectively and frequency modulation means connected to frequency modulate said second subcarriers with the combined output products of a third and a fourth of said channels respectively to produce a pair of amplitude modulation products in phase quadrature and a pair of frequency modulation products in phase quadrature, carrier transmission means, and means modulating said transmitter with said two last mentioned pairs of modulation products, said signals, first and second subcarriers and carrier transmission means having respectively progressively higher frequency ranges.

4. A multiplex transmission system comprising four channels, each including four signal sources, means for supplying to each channel a pair of first carriers of the same frequency but differing in phase by 90°, means in each channel for modulating both of said carriers by signals from two of said sources but with different types of modulation, means in each channel for combining the modulation products from both carriers into a combined output, a source of a pair of second carriers of the same frequency but differing in phase by 90°, means modulating both of said second carriers by the combined modulation products from two of said channels but with different types of modulation, means for combining the modulation products from both of said second carriers and means for transmitting said last combined modulation products, said signals, first and second carriers and transmission means having respectively progressively higher frequency ranges.

5. A multiplex receiving system for selecting signals derived from a received carrier modulated by a pair of first subcarriers of 90° phase difference with modulation products of a first local subcarrier of 90° phase difference which are modulated by different signals, which receiving system comprises a receiver responsive to the received carrier, first demodulator means, means supplying to said first demodulator means an I. F. subcarrier corresponding in frequency and phase to a selected one of said first subcarriers, said demodulator means being adapted to reproduce the modulation products of said first subcarrier, first detector means responsive to said last products and adapted to reproduce the modulation products of a selected one of the types of modulations of said first subcarrier, second demodulation means, means supplying thereto a second local subcarrier corresponding in frequency and phase to a selected one of said first mentioned second subcarriers to derive therefrom a second series of modulation products, second detector means selectively responsive to each of said two types of modulations to derive a selected signal from said last series of products.

6. A receiving system as set forth in claim 5 in which said modulation types are amplitude modulation and frequency modulation, and said demodulators include amplitude demodulation means and frequency demodulation means.

7. A multiplex transmitting and receiving system comprising a plurality of channels, a plurality of different signal sources in each channel, modulation means in each channel, means supplying to said modulation means a pair of first subcarriers of the same frequency but differing in phase by 90°, said modulating means being connected to modulate each of said first subcarriers with signals from a selected two of said signal sources with different types of modulation and to suppress the subcarrier from the modulation products, means for combining the modulation products of each channel, second modulation means, means supplying to said second modulation means a pair of second subcarriers of the same frequency but differing in phase by 90°, said second modulator means being connected to modulate each of said second subcarriers with the combined modulation products of a pair of said channels by different types of modulation and being adapted to suppress the second subcarrier from the produced modulation products, means combining said last modulation products, carrier transmission means, means modulating said carrier by said last combined modulation products for transmission to a distant point, said signals, first and second subcarriers and said carrier having successively progressively higher frequency ranges, a receiver responsive to said transmitted carrier, first demodulator means, means supplying to said first demodulator means a first local subcarrier corresponding in frequency and phase to a selected one of said suppressed second subcarriers to derive from said receiver a first series of modulation products, detector means selectively responsive to said two types of modulation to derive modulation products corresponding to the output products of one of said channels, second demodulator means, means supplying to said second demodulator means a second local subcarrier corresponding in frequency and phase to a selected one of said suppressed first subcarriers, said second demodulator means being connected to derive a series of modulation products, second detector means selectively responsive to said two types of modulation to derive from said last products a signal from a selected one of said sources.

8. A system as set forth in claim 7 in which said two modulation types are amplitude modulation and frequency modulation, and said modulators and demodulators include amplitude modulation means and demodulation means respectively and frequency modulation means and demodulation means respectively.

9. A system as set forth in claim 7 in which said signals are television type signals and said carrier transmission means comprises a radio transmitter and closed circuit means is provided for transmitting said first subcarrier to said receiver.

10. A multiplex transmission system comprising a plurality of channels, each including a group of different signal sources, a source of a first subcarrier, separate modulation means in each channel connected to amplitude modulate and frequency modulate said first subcarrier by signals from different sources in the respective groups to produce first amplitude modulation and frequency modulation products respectively, means combining the modulation products of each channel into a combined output, a source of a second subcarrier, modulation means connected to amplitude modulate said second subcarrier with the combined modulation output of one of said channels and to frequency modulate said second subcarrier with the combined modulation output of another of said channels to form second amplitude and frequency modulation products, and means transmitting said second modulation products, said signals and first and second subcarriers having respectively progressively higher frequency ranges.

References Cited in the file of this patent

UNITED STATES PATENTS

| | | |
|---|---|---|
| 1,861,462 | Trouant | June 7, 1932 |
| 2,256,317 | Earp | Sept. 16, 1941 |
| 2,547,598 | Roschke | Apr. 3, 1951 |
| 2,559,644 | Landon | July 10, 1951 |